April 5, 1938.  G. LUNNING  2,113,513
CLUTCHLESS HIGH LIFT PLOW
Filed April 30, 1937  2 Sheets-Sheet 1
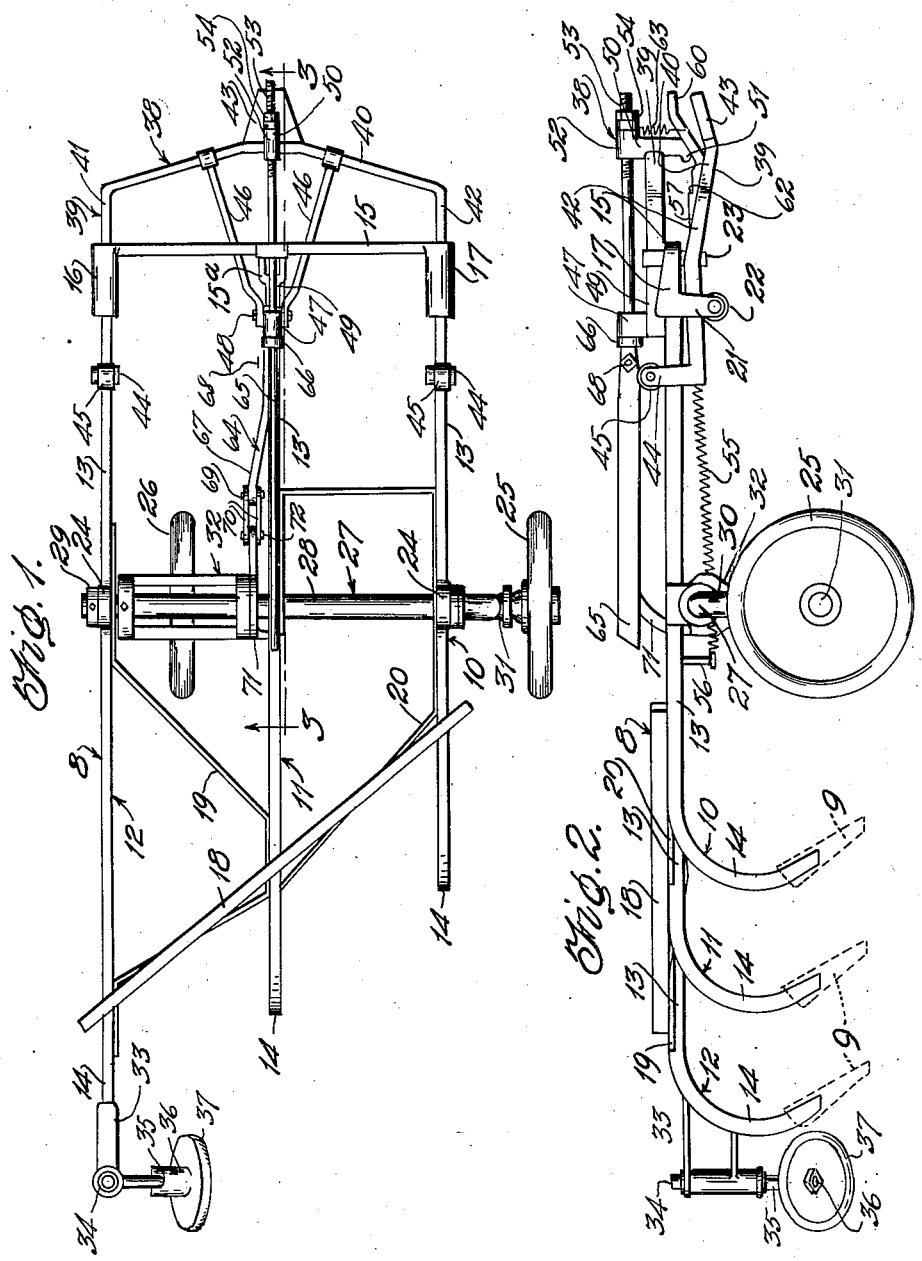
Inventor
GAYLORD LUNNING,
By Kimmel & Crowell
Attorneys

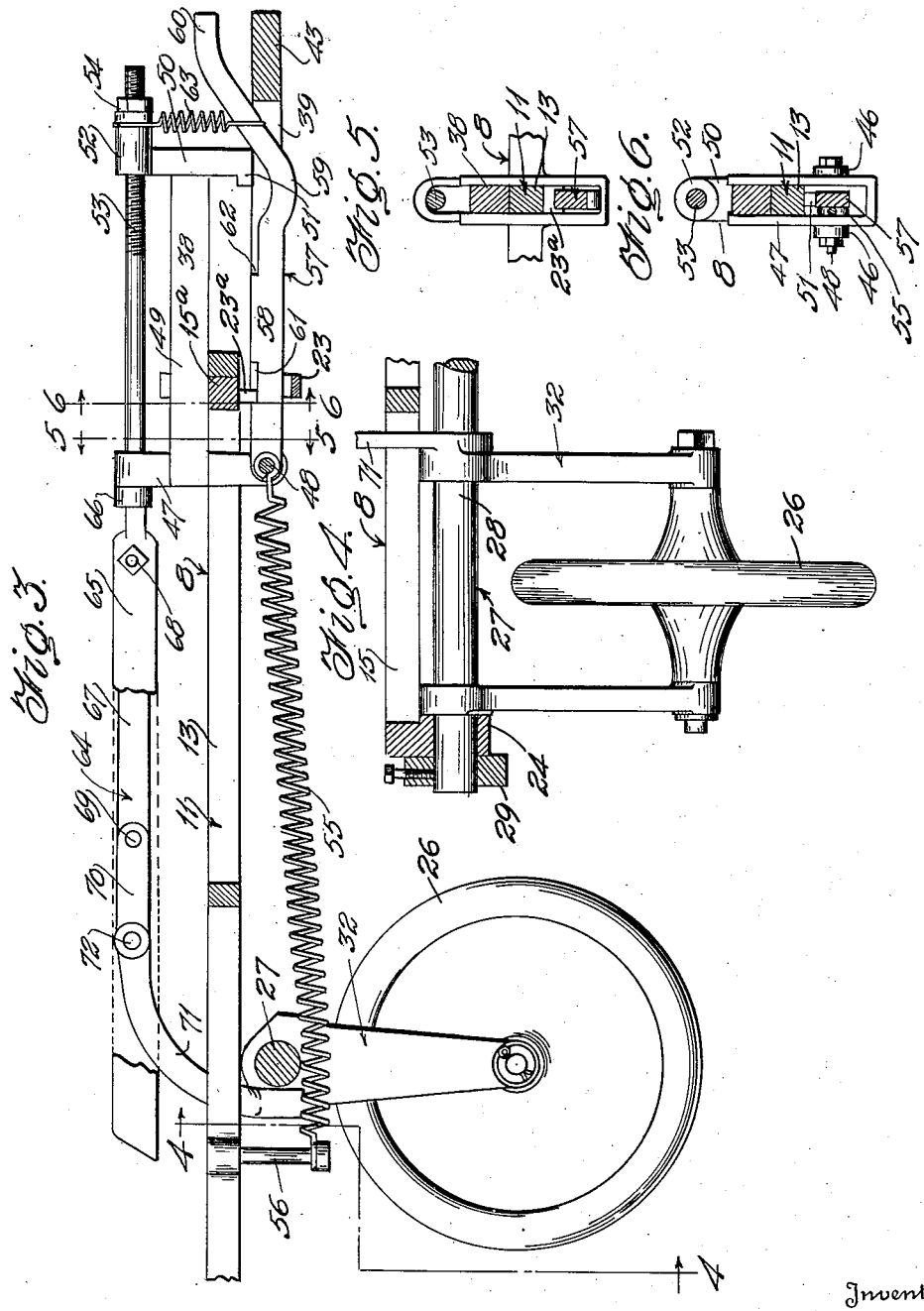

Patented Apr. 5, 1938

2,113,513

UNITED STATES PATENT OFFICE 2,113,513

CLUTCHLESS HIGH LIFT PLOW

Gaylord Lunning, Garretson, S. Dak., assignor of one-half to Ben O. Wangsness and Anton C. Halls, both of Garretson, S. Dak.

Application April 30, 1937, Serial No. 140,045

3 Claims. (Cl. 97—75)

This invention relates to a clutchless high lift plow.

The primary object of the invention is to provide, in a manner as hereinafter referred to, a structural arrangement that will permit of the ground working element or elements being raised out of the ground or lowered into the ground without the use of the clutching means now generally employed for such purpose.

A further object of the invention is to provide, in a manner as hereinafter set forth, a clutchless high lift plow including a land wheel positioned under the plow frame or body, a furrow wheel in laterally extended relation with respect to one side of the frame and an axle common to said wheels.

A further object of the invention is to provide, in a manner as hereinafter set forth, a structure which permits of the land wheel to be positioned underneath the plow frame or body, instead of outwardly of one side of the latter, thus permitting the plow to be in perfect balance at all times and causing a straight pull on the draw bar thus eliminating side draft.

A further object of the invention resides in the mounting of the land and furrow wheels on a common shaft therefor thus simplifying the plow construction.

A further object of the invention resides in the arrangement that permits of the plow frame or body to be built with full length beams thereby making possible a simple sturdy construction and thus overcoming the spring and sagging in the ordinary plow construction employing split beams.

A further object of the invention resides in the provisions whereby the rear furrow wheel is raised up when the plow is raised out of the ground, thus providing for the plow, when not in action, to be mounted on two wheels, i. e., the forward furrow wheel and land wheel, which in turn permits of the backing, turning and pulling of the plow in a cart-like manner.

Further objects of the invention are to provide, in a manner as hereinafter set forth, a clutchless high lift plow which is comparatively simple in its construction, and arrangement, strong, durable, compact, thoroughly efficient in the use intended thereby, readily assembled, conveniently adjusted, comparatively inexpensive to manufacture and capable of being readily repaired when occasion requires.

To the above ends essentially and to others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention as claimed.

In the drawings:

Figure 1 is a top plan view of the plow,

Figure 2 is a side elevation with the plow in lifted position,

Figure 3 is a section on line 3—3, Figure 1,

Figure 4 is a section on line 4—4, Figure 3,

Figure 5 is a section on line 5—5, Figure 3, and

Figure 6 is a section on line 6—6, Figure 3.

With reference to the drawings, 8 generally indicates the body part of the plow. The said body part 8 is so formed to provide a series of beams and a series of standards for ground work-devices of any desirable type, shown in dotted lines Figure 2, by way of example, as shovels and indicated at 9. The body part 8 includes an intermediate section and a pair of outer sections arranged in parallel spaced relation and with said sections progressively increasing in length from one of the outer sections to the other. The said sections are indicated at 10, 11 and 12 and each of which is in the form of a continuous bar consisting of an elongated straight stretch 13 and a depending rear stretch 14 substantially in the form of the segment of a circle. The stretches 13 provide continuous one-part beams and the stretches 14 constitute continuous one-part curved standards for attaching thereto ground-working devices. The beams progressively increase in length from one side to the other side of body part 8. The forward ends of the sections 10, 12 align. The forward end of the section 11 extends forwardly with respect to the forward ends of sections 10, 12. The different lengths of and the manner of setting up the sections 10, 11 and 12 with respect to each other provide for the disposing of the standards in substantially tandem-wise relation, that is to say the standard on section 10 forwardly of the standard on section 11 and the standard on section 12 forwardly of the standard on section 12. The body part 8 includes a horizontally disposed yoke-shaped front section 15 which is formed centrally with an integral rearwardly extending block 15ª anchored to the forward end of section 11. The sides 16, 17 of section 15 extend rearwardly, are enlarged and are anchored to the forward ends of the sections 10, 12 respectively. The body part 8 includes a rear section 18 which is in the form of an inclined continuous bar arranged in superimposed relation with respect to and anchored with the rear ends of the stretches 13 of the sections 10, 11 and 12. A V-shaped combined bracing and spacing element 19 is arranged between the rear portions of the stretches 13 of the sections 11, 12, as well as being anchored to the inner sides of such stretches. A combined bracing and spacing element 20 is arranged between the sections 10, 11. The element 20 is anchored to spaced points of section 11 and to one point of section 10. The sides 16, 17 of section 15 are of greater width than the sections 10, 12 and extend laterally in opposite directions to such sections. Formed integral with the rear ends of the sides 16, 17 of section 15 and depending below said sides and sections 10, 12 are hangers 21 provided therein at their lower ends with supporting rollers 22 which are arranged below and spaced from sections 10, 12. Fixed to, extending above and depending below the block 15a is a U-shaped hanger 23 constituting a combined support and guide for a latching member to be referred to. The block 15a has a depending lug 23a constituting a stop arranged within the lower portions and spaced from the bottom of hanger 23. The stretches 13 of the sections 10, 12 are provided intermediate their ends with depending bearings 24 which align with each other.

The plow includes an adjustable forward furrow wheel 25 and a land wheel 26. The latter is arranged below the top of body part 8. The wheel 25 is disposed in lateral relation with that side of body part 8 provided by the section 10. Carried by the bearings 24 is an axle 27 which is common to the wheels 25, 26. The axle 27 is formed with a part 28 disposed in transverse relation to the body part 8, journaled in the bearings 24, extending outwardly from said bearings and carrying a stop collar 29 arranged outwardly adjacent the bearing 24 on section 12. That end of the part 28 of axle 27 which extends outwardly from bearing 24 on section 10 merges into a depending part 30 having its lower end formed with suitable means, as indicated at 31 for revolubly supporting the wheel 25. Loosely mounted on the axle part 28 between sections 11, 12 is a depending hanger 32 for revolubly supporting the wheel 26 underneath the top of body part 8.

The upper portion of depending stretch 14 of section 12 of the body part 8 has connected thereto or formed integral therewith a rearwardly extending arm or support 33 carrying an upstanding pillar or post 34 formed with an outwardly disposed angular lower end portion 35 provided with a downwardly inclined inwardly extending means 36 for revolubly supporting a caster or rear furrow wheel 37.

The plow includes a slidable spring controlled latchable forwardly and rearwardly movable draw-bar structure generally indicated at 38 and formed of a horizontally disposed yoke-shaped member 39 which is open at its rear. The member 39 consists of a front 40 and a pair of sides 41, 42. The front 40 centrally thereof is provided with a forwardly extending part 43 for connection to a traction means, not shown for the plow. The front 40 depends below the front ends of the sides 41, 42. These latter extend through the hangers 21 and are seated on the rollers 22. The rear ends of the sides 41, 42 are connected to hangers 44 which are slidably mounted on and depend from the sections 10, 12 of body part 8. The hangers 44 carry rollers 45 which travel on the upper edges of sections 10, 12. The member 39 is arranged below and is capable of being shifted in opposite directions with respect to the forward portion of body part 8. Connected at their forward ends to the front 40 of member 39 adjacent the sides of the part 43 is a pair of rearwardly extending oppositely inwardly inclined coupling bars 46 having their rear ends positioned at the lower portion of the outer side face of a vertically extending inverted slidable yoke 47. The rear ends of bars 46 are connected with the yoke 47 by a pivot 48. The yoke 47 is arranged at the sides of and extends above the stretch 13 of body part section 11. Fixedly secured at its rear end to the yoke 47 is a short bar 49 which is slidably mounted on body part section 11. The bar 49 at its forward end emerges into the rear edge of an angle-shaped vertically disposed head 50 having its lower portion 51 extended rearwardly and its upper portion in the form of an internally threaded sleeve 52. The bar 49 is disposed intermediate the ends of head 50. Threadedly engaging with the sleeve 52 is a peripherally threaded adjustable rod 53 which is of greater length than and is arranged in superposed relation with respect to the bar 49. The rod 53 is for the purpose of adjusting an elevating and lowering mechanism, to be referred to, for the hanger 23, as well as constituting a means for coupling such mechanism to the draw-bar structure 38 whereby the said mechanism will be operated on the shifting of structure 38 in opposite directions. The rod 53 extends forwardly from the head 50 and is of a length to extend through the upper portion of the yoke 47. The rod 53 carries a locking nut 54 therefor. The nut is arranged forwardly of sleeve 52, the latter constituting an abutment for the nut. The controlling spring for the draw-bar structure 38 is indicated at 55. Spring 55 is anchored at its forward end to pivot 48 and at its rear end to the lower end of a hanger 56 which depends from the stretch 13 of body part section 11. The arm 56 is arranged rearwardly of the part 28 of axle 27. Spring 55 is arranged below the said part 28.

A spring controlled latching member 57 is employed for selectively latching the draw-bar structure 38 in extended and in non-extended position against the action of spring 55. The member 57 is formed of a straight rear stretch 58, an intermediate curved stretch arranged in depending relation with respect to the forward end of stretch 58, and an upstanding forward stretch 60 of a length to extend beyond the forward end of rod 53. The stretch 58 intermediate its ends is formed with a notch 61. The stretch 58 at its forward end terminal portion is reduced to form an abutment 62. The width of stretches 59, 60 corresponds to the width of the reduced forward end terminal portion of the stretch 58. The latter has its rear end extend into the lower end of yoke 47. The rear end of stretch 58 is loosely mounted on pivot 48. The latching member 57 extends through the lower portion of the yoke 23. The controlling spring for latching member 57 is indicated at 63. Spring 63 is arranged forwardly of head 50, has its upper end anchored to sleeve 52 and its lower end anchored to stretch 60 of member 57. Spring 63 permanently tends to maintain the stretch 60 in an elevated position. The stretch 59 of member 57 provides a clearance for the lower end of head 50. The notch 61 coacts with the lug 23a for latching structure 38 in extended position. The abutment 62 coacts with the lug 23ª for latching structure 38 in non-extended position.

The sides 16, 17 of section 15 constitute abutments coacting with the hangers 44 for limiting the extent of the forward sliding of the structure 38. The lower portion 51 of head 50 coacts with the front of section 15 to arrest the upward movement of the structure 38 when the latter is in non-extended position. The head 50 coacts with the front of section 15 for limiting the extent of the rearward movement of structure 38.

The elevating and lowering mechanism 64 for the hanger 32 consists of a pull arm 65 having its forward end fixed to a head 66 on the rear end of rod 53. The arm 65 is disposed in superposed relation with respect to the stretch 13 of body part section 11. A lever 67 is arranged at one side of and has its forward end pivotally connected as at 68 to the arm 65. Fixed at their forward ends to the rear end of lever 67, as at 69 is a pair of spaced parallel links 70. Extending between the rear ends of the links 70 is an elevating and lowering member 71 for the hanger 32. The member 71 has a curved depending rear portion which is fixed at its lower terminus to one side of the upper end of hanger 32. The member 71 has its forward end pivotally connected as at 72 to the rear ends of the links 70.

With reference to the operation of lifting and lowering of the plow, Figures 1, 2 and 3 illustrate the plow in its lifted position. By pressing downwardly on member 57, notch 61 is moved clear of lug 23ª whereby the spring 55 will cause the drawbar structure 38 to move rearwardly to an extent to position abutment or stop 62 rearwardly of lug 23ª. As structure 38 slides rearwardly the arm 65 moves in like direction and will provide for the lowering of lever 67, links 70 and member 71 whereby hanger 32 will be lowered. To raise the plow member 57 is lowered to have abutment or stop 62 to clear lug 23ª, then by a pull on structure 38 the latter slides forwardly whereby the mechanism 64 is actuated in a manner to provide for the elevating of hanger 32 thus lifting the plow out of the ground. A lever (not shown) is to be attached to plow for elevating and lowering furrow wheel, as in ordinary plows.

What I claim is:

1. In a plow, a body part, an axle supported therefrom, a furrow wheel carried by the axle in extended relation with respect to said body part, a hanger loosely mounted on the axle, a land wheel bodily carried with and revolubly supported on the hanger, said wheel being arranged beneath said body part, a forwardly and rearwardly movable spring controlled pull bar structure slidably supported by the front portion of said body part and including a latching member, said body part and member having coacting means for latching said structure in extended and non-extended relation with respect to said body part, and an elevating and lowering mechanism for said hanger, said mechanism being connected to said structure and actuated in a direction to elevate the hanger when said structure moves forwardly and actuated in a direction to lower the hanger when said structure moves rearwardly.

2. The invention as set forth in claim 1 having said body part and structure provided with coacting means for limiting the extent of the forward movement of said structure.

3. The invention as set forth in claim 1 having said body part and said structure provided with coacting means for limiting the extent of the rearward movement of said structure and to prevent the upward movement of said structure when the latter is in non-extended relation with respect to said body part.

GAYLORD LUNNING.